US007389433B2

(12) United States Patent
Sunagawa et al.

(10) Patent No.: US 7,389,433 B2
(45) Date of Patent: Jun. 17, 2008

(54) IMAGE FORMING SYSTEM

(75) Inventors: Hiroyuki Sunagawa, Ami-machi (JP); Tetsuya Hashimoto, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 301 days.

(21) Appl. No.: 11/118,999

(22) Filed: Apr. 29, 2005

(65) Prior Publication Data

US 2006/0027110 A1 Feb. 9, 2006

(30) Foreign Application Priority Data

Apr. 30, 2004 (JP) ............................ 2004-135016
Apr. 22, 2005 (JP) ............................ 2005-125058

(51) Int. Cl.
*G06F 1/26* (2006.01)
*G06F 1/32* (2006.01)

(52) U.S. Cl. ...................................................... 713/320

(58) Field of Classification Search ................. 713/320
See application file for complete search history.

(56) References Cited

U.S. PATENT DOCUMENTS 5,068,853 A * 11/1991 Soma et al. .................. 714/24
5,988,061 A 11/1999 Kagawa
6,177,739 B1 * 1/2001 Matsudaira et al. ........ 307/125
6,334,719 B1 1/2002 Kimura
6,405,000 B1 * 6/2002 Nakaya ....................... 399/67
6,763,473 B1 7/2004 Oteki et al.
7,062,191 B2 * 6/2006 Matsukura .................. 399/88
2002/0001100 A1 * 1/2002 Kawanabe ................. 358/1.15
2006/0200704 A1 * 9/2006 Takashi et al. ............... 714/38

FOREIGN PATENT DOCUMENTS

JP 2001-138473 5/2001

* cited by examiner

*Primary Examiner*—Thomas Lee
*Assistant Examiner*—Jaweed A Abbaszadeh
(74) *Attorney, Agent, or Firm*—Matthew K. Ryan; Frommer Lawrence & Haug, LLP

(57) ABSTRACT

An image forming portion carries out image formation processing where an image is formed an a recording medium on the basis of image information and is provided with a drive motor portion for driving predetermined mechanisms employed in the image formation processing and a control sensor portion for controlling the predetermined mechanisms, and a power source portion for supplying electric power to the image forming portion. A start instruction detecting portion detects start instruction to start the image formation processing, and a power source control portion inhibits the power source portion from supplying the electric power to the drive motor portion and/or the control sensor portion before the start instruction detecting portion detects the start instruction when the image formation processing is not being performed.

16 Claims, 6 Drawing Sheets

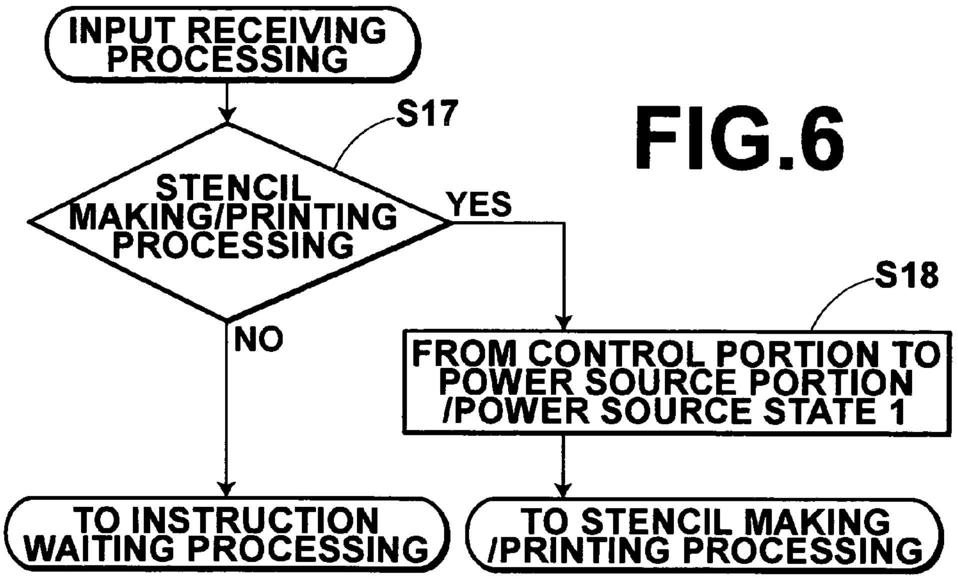
FIG.6
FIG.7
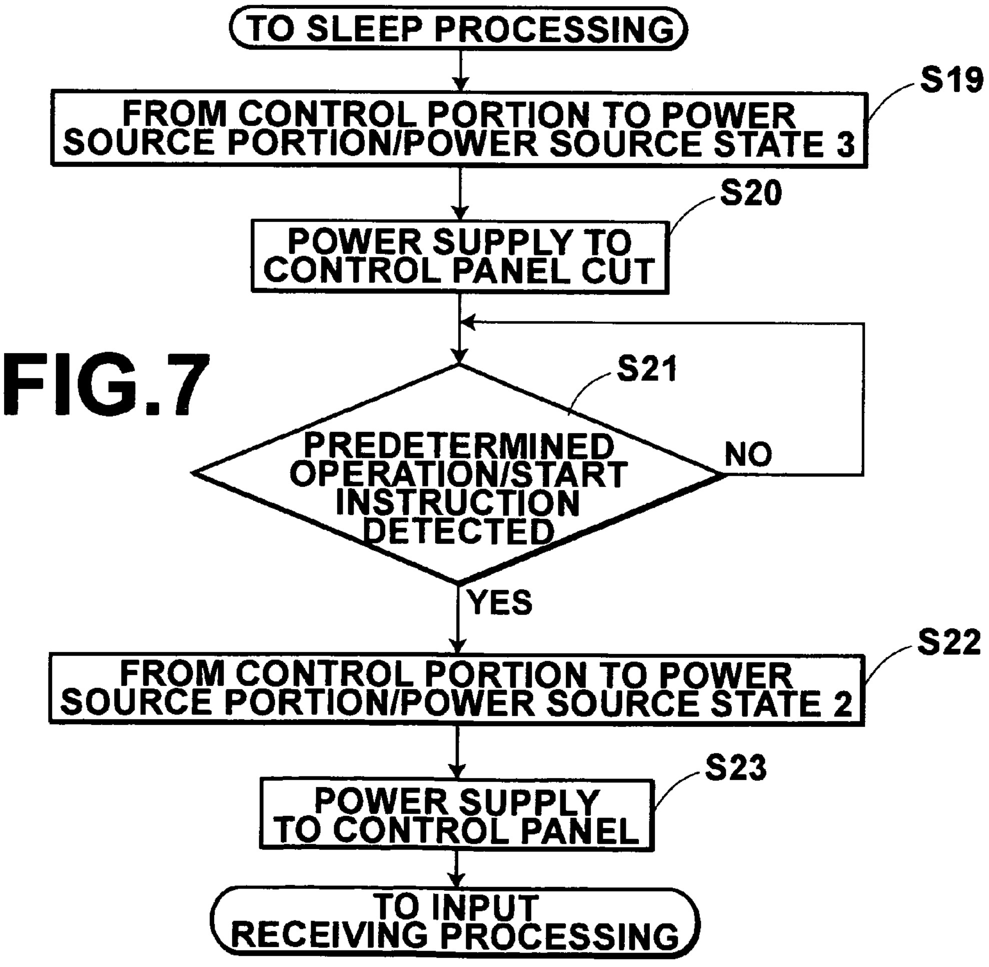

IMAGE FORMING SYSTEM

BACKGROUND OF THE INVENTION

1. Field of the Invention

This invention relates to an image forming system for forming an image on a recording medium, and more particularly to an image forming system provided with a power-saving mode where the power supply to a part thereof is interrupted when the operator does not operate the system for a predetermined time interval.

2. Description of the Related Art

There have been proposed various image forming systems provided with a power-saving mode, where the power supply to a part thereof is interrupted when the operator does not operate the system for predetermined time interval, for instance, in a stencil printer in which a stencil is made on the basis of image data and print is made on the basis of the stencil or a copy system.

For example, there has been proposed, as disclosed in Japanese Unexamined Patent Publication No. 2001-138473, an image forming system with a power-saving mode where, when the operator does not operate the system for predetermined time interval, the electric power is supplied only to a unit for receiving image data from an external unit and the electric power supply to the other part including the parts for driving the stencil making system and the printing system is cut. Further in U.S. Pat. No. 6,763,473, there has been proposed a system where the electric power supply to the scanner and/or the image processing system is cut when the image forming system is not operated for a long time.

In the systems disclosed in Japanese Unexamined Patent Publication No. 2001-138473 and U.S. Pat. No. 6,763,473, the power supply to all the parts of the system is resumed in response to any operation of the operator on the system.

However, it takes a time for the operator to actually start, for instance, printing. For example, it takes a certain time for the operator to set predetermined items, for instance, through the control panel of the printer or to actually instruct to print after he or she sets the printing papers. It is wasteful to supply the electric power to all the parts of the system in such times though the stencil making action or the printing action has not been started yet.

Further, though the power supply to the control panel or the like is generally cut in the power-saving mode, it takes a long time for the control panel to accept input of an instruction to operate the system when the power supply to the control panel or the like is cut. Further, the contents of the preceding instruction are sometimes reset when the operator's input is slow and the system is turned to the power-saving mode. In this case, it is necessary for the operator to input again the instruction to operate the system, which is troublesome for the operator. In order to release himself or herself, the operator can cancel the power-saving mode, which gives rise to a problem that power reduction cannot be obtained after all.

SUMMARY OF THE INVENTION

In view of the foregoing observations and description, the primary object of the present invention is to provide an image forming system which can more reduce the power consumption before starting the image formation processing when the image formation processing is not being performed.

Another object of the present invention is to provide an image forming system which can reduce the power consumption without causing the operator to feel the above-mentioned trouble.

In accordance with the present invention, there is provided an image forming system comprising an image forming portion which carries out image formation processing where an image is formed on a recording medium on the basis of image information and is provided with a drive motor portion for driving predetermined mechanisms employed in the image formation processing and a control sensor portion for controlling the predetermined mechanisms, and a power source portion for supplying electric power to the image forming portion, wherein the improvement comprises a start instruction detecting portion which detects start instruction to start the image formation processing, and a power source control portion which inhibits the power source portion from supplying the electric power to the drive motor portion and/or the control sensor portion before the start instruction detecting portion detects the start instruction when the image formation processing is not being performed.

In the case of the above-mentioned stencil printer, the image forming system may further comprise an internal voltage control portion which controls the internal voltage of the power source portion to be lower before the start instruction detecting portion detects the start instruction when the image formation processing is not being performed than while the image formation processing is being performed.

The image forming system may further comprise an image processing portion which carries out image processing on the image information and a work clock control portion which controls a work clock of the image processing portion to be slower before the start instruction detecting portion detects the start instruction when the image formation processing is not being performed than while the image formation processing is being performed.

The image forming system may further comprise a control portion which controls predetermined mechanisms before the start instruction detecting portion detects the start instruction and a control clock control portion which controls a control clock of the control portion to be slower before the start instruction detecting portion detects the start instruction when the image formation processing is not being performed than while the image formation processing is being performed.

The image forming system may further comprise an operation detecting portion which detects a predetermined operation by the operator before the start instruction detecting portion detects the start instruction when the image formation processing is not being performed, wherein the power source control portion continues to inhibit the power source portion from supplying the electric power to the drive motor portion and/or the control sensor portion while the image forming system is in a waiting state from the time when the operation detecting portion detects a predetermined operation to the time when the start instruction detecting portion first detects the start instruction after detection of the predetermined operation.

The image forming system may further comprise a display portion which displays predetermined operations of the image forming portion and at the same time, receives operation instruction by the operator, wherein the power source control portion supplies the electric power from the power source portion to the display portion while the image forming system is in the waiting state.

The display portion may have a control panel which displays predetermined operations of the image forming portion wherein the power source control portion inhibits the power source portion from supplying the electric power to the control panel portion when the operation detecting portion does not detect the predetermined operation for predetermined time interval from the time at which the predetermined time interval lapses to the time at which the image forming system comes to be in the waiting state.

The image forming system may further comprise an internal voltage control portion which controls the internal voltage of the power source portion to be lower while the image forming system is in the waiting state than while the image formation processing is being performed.

The internal voltage control portion may control, when the operation detecting portion does not detect the predetermined operation for predetermined time interval, the internal voltage of the power source portion to be lower from the time at which the predetermined time interval lapses to the time at which the image forming system comes to be in the waiting state than while the image forming system is in the waiting state.

The image forming system may further comprise an image read-out portion which reads an original and outputs image information wherein the predetermined operation is setting of the original to the image read-out portion.

The image forming system may further comprise an image read-out portion which reads an original and outputs image information wherein the predetermined operation is operation of an original press plate in the Image read-out portion.

The image forming system may further comprise an image processing portion which carries out image processing on the image information and a work clock control portion which controls a work clock of the image processing portion to be slower when the Image forming system is in the waiting state than while the image formation processing !s being performed.

The image forming system may further comprise a control clock control portion which controls, when the operation detecting portion does not detect the predetermined operation for predetermined time interval, a control clock of a control portion controlling predetermined mechanisms from the time at which the predetermined time interval lapses to the time at which the image forming system comes to be in the waiting state to be slower than that of the control portion while the image processing is being executed.

The power source portion may comprise a main power source portion and a sub-power source portion smaller in power than the main power source portion, while the power source control portion may control the power source portion to use only the sub-power source portion without using the main power source portion before the start instruction detecting portion detects the start instruction when the image formation processing is not being performed.

The above-mentioned "drive motor portion" means, for instance, a motor used for driving a predetermined mechanism for reading an original, making a stencil or making print, and includes (but not limited to), for instance, a pulse motor for driving a moving mechanism for moving the read-out portion of a scanner, a roller motor for driving rollers for conveying a stencil material, a press roller motor for driving a press roller for stencil printing and an ink motor for supplying ink to the inside of a printing drum. When the image forming portion is provided with a peripheral device such as a paper supply portion or a paper discharge portion, the "drive motor portion" may include a drive motor employed in driving a mechanism of the peripheral device. When the electric power supply to the "drive motor portion" is interrupted, the electric power supply to all the drive motor portion need not be interrupted but only the electric power supply to a part of the drive motor portion may be interrupted.

Further, the above-mentioned "control sensor portion" means, for instance, a sensor used for driving a predetermined mechanism for reading an original, making a stencil or making print, and includes (but not limited to), for instance, a master position sensor which detects the position of the stencil and is used for controlling the stencil conveyor mechanism, a printing drum speed sensor and a printing drum angle sensor which respectively detect the speed and the angle of printing drum and are used for controlling the printing drum rotating mechanism, and an ink sensor which detects ink in the printing drum and is used for controlling the ink supply mechanism. when the image forming portion is provided with a peripheral device such as a paper supply portion or a paper discharge portion, the "control sensor portion" may include a sensor employed for controlling a mechanism in the peripheral device. When the electric power supply to the "control sensor portion" is interrupted, the electric power supply to all the control sensor portion need not be interrupted but only the electric power supply to a part of the control sensor portion may be interrupted.

The above-mentioned "predetermined operation" means the operation on the image forming system and the operation necessary for formation of an image, and includes direct operations on the image forming system such as, for instance, opening and closing of the original press plate for pressing an original against an original table, setting of an original to the original table, opening and closing of a door in the image forming portion, touch to a control panel and insertion of a storage means such as a memory card storing image data as well as indirect operations on the image forming system which are carried out in external devices connected to the image forming system such as a computer, cellular phone or digital camera.

The above-mentioned "operation detecting portion" is a means for detecting the above "predetermined operation" and includes, for instance, an original press plate sensor which detects opening and closing of the original press plate, an original sensor which detects that an original has been set to the original table, a door switch which detects opening and closing of a door in the image forming portion, a touch sensor which detects touch to a control panel and a detecting system which detects insertion of a storage means such as a memory card storing image data as well as a detecting system which detects input of a signal from an external device connected to the image forming system such as a computer, cellular phone or digital camera.

Further, in the case where the "operation detecting portion" detects a plurality of operations, the expression "to detect a predetermined operation" means detection of first one of the plurality of operations.

In the image forming system in accordance with the present invention, the power supply from the power source portion to the drive motor portion and/or the control sensor portion is inhibited before the start instruction detecting portion detects the start instruction when the image formation processing is not being performed. Accordingly, wasteful power supply to the drive motor portion and/or the control sensor portion which is not being used can be cut, and the power consumption before starting the image formation processing can be reduced.

When the internal voltage of the power source portion is controlled to be lower before the start instruction detecting portion detects the start instruction when the image formation processing is not being performed than while the image formation processing is being performed in the above-mentioned stencil printer, the transformation efficiency is improved and the power consumption can be more reduced.

Further, when the work clock of the image processing portion is controlled to be slow before the start instruction detecting portion detects the start instruction when the image formation processing is not being performed, the power consumption can be more reduced.

Further, when the control clock of the control portion which controls the predetermined mechanisms before the start instruction detecting portion detects the start instruction is controlled to be slow when the image formation processing is not being performed, the power consumption can be more reduced.

Further, when the image forming system further comprises an operation detecting portion which detects a predetermined operation by the operator before the start instruction detecting portion detects the start instruction when the image formation processing is not being performed, and the power source control portion continues to inhibit the power source portion from supplying tie electric power to the drive motor portion and/or the control sensor portion while the image forming system is in a waiting state from the time when the operation detecting portion detects a predetermined operation to the time when the start instruction detecting portion first detects the start instruction after detection of the predetermined operation, the power consumption can he reduced, for instance, while the operator sets and/or inputs predetermined items.

Further, when the electric power is supplied to the display portion while the image forming system is in the waiting state, operation instruction by the operator can be adequately received and at the same time, the power consumption can be reduced.

Further, when the power source control portion inhibits the power source portion from supplying the electric power to the control panel portion when the operation detecting portion does not detect the predetermined operation for predetermined time interval from the time at which the predetermined time interval lapses to the time at which the image forming system comes to be in the waiting state, further the power consumption of the control panel portion can be reduced.

Further, when the internal voltage of the power source portion is controlled to be lower while the image forming system is in the waiting state than while the image formation processing is being performed, the transformation efficiency is improved and the power consumption can be more reduced.

Further, when, when the operation detecting portion does not detect the predetermined operation for predetermined time interval, the internal voltage of the power source portion is controlled to be lower from the time at which the predetermined time interval lapses to the time at which the image forming system comes to be in the waiting state than while the image forming system is in the waiting state, the power consumption can be more reduced.

When setting of the original to the image read-out portion or operation of an original press plate in the image read-out portion is detected and the power source portion continues to be inhibited from supplying the electric power to the drive motor portion and/or the control sensor portion and the display portion is caused to display while the image forming system is in a waiting state from the time when the operation detecting portion detects the operations to the time when the start instruction detecting portion first detects the start instruction after detection of the operations, the power consumption can be more reduced, excellent operating feeling can be obtained and a quick response can be taken.

When the work clock of the image processing portion is controlled to be slow when the image forming system is in the waiting state, the power consumption can be more reduced.

When, when the operation detecting portion does not detect the predetermined operation for predetermined time interval, a control clock of the control portion controlling the predetermined mechanisms from the time at which the predetermined time interval lapses to the time at which the image forming system comes to be in the waiting state is controlled to be slow, the power consumption can be more reduced.

Further, when the power source portion comprises a main power source portion and a sub-power source portion smaller in power than the main power source portion, and the power source control portion controls the power source portion to use only the sub-power source portion without using the main power source portion before the start instruction detecting portion detects the start instruction when the image formation processing is not being performed, the power source portion can be more sufficiently used and the power consumption can be more reduced.

BRIEF DESCRIPTION OF THE DRAWINGS

FIG. 6 is a view showing a flow chart for illustrating the input receiving processing, and FIG. 7 is a view showing a flow chart for illustrating the sleep processing.

DESCRIPTION OF THE PREFERRED EMBODIMENT

Figure 1:
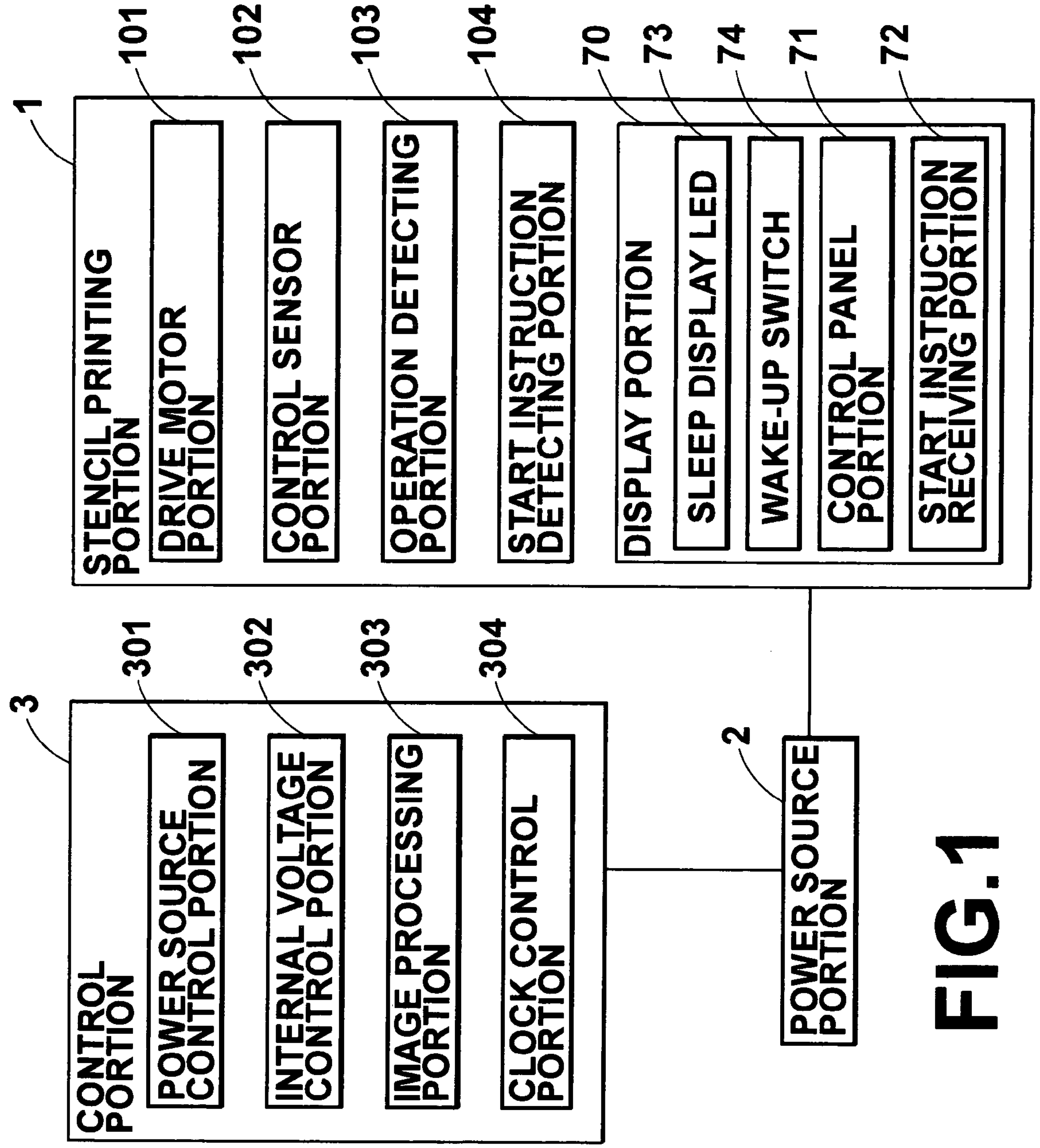
FIG. 1 is a block diagram showing a stencil printer employing an image forming system in accordance with an embodiment of the present invention.

As shown in FIG. 1, a stencil printer employing an image forming system in accordance with an embodiment of the present invention comprises a stencil printing portion 1 which obtains image information by reading an original, makes a stencil on the basis of the image information, and makes print on printing papers by the use of the stencil, a power source portion 2 which supplies electric power to the stencil printing portion 1 and a control portion 3 which controls actions of predetermined mechanisms in the stencil printing portion 1 and supply of electric power to the stencil printing portion I by the power source portion 2.

The arrangement of the stencil printing portion 1 will be described with reference to FIG. 2, hereinbelow.

Figure 2:
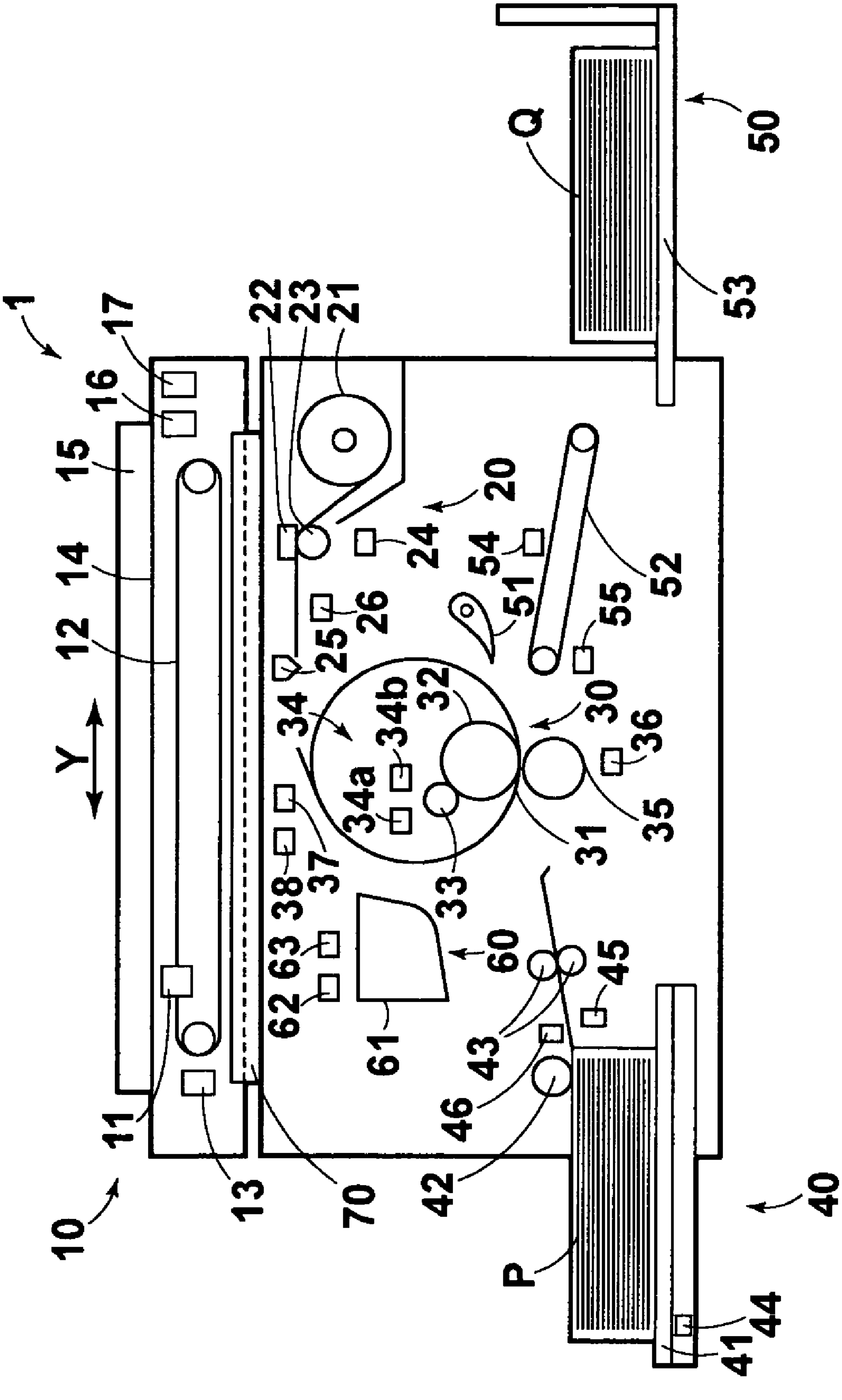
FIG. 2 is a view showing the stencil printing portion of the stencil printer shown in FIG. 1.

As shown in FIG. 2, the stencil printing portion 1 comprises an image read-out portion 10 which reads an image on an original, a stencil making portion 20 which makes a stencil from a stencil material on the basis of the image information obtained by the image read-out portion 10, a printing portion 30 which makes print on printing papers by the use of the stencil made by the stencil making portion 20, a paper supply portion 40 which supplies the printing paper to the printing portion 30, a paper discharge portion 50 which discharges the printed printing paper from the printing portion 30, a stencil discharge portion 60 which discharges the stencil after use from the printing portion 30, and a display portion 70 which displays predetermined operations and at the same time receives operation instructions by the operator.

The image read-out portion 10 may comprise, for instance, a flat-bed type scanner, and comprises an image line sensor 11 having a number of photoelectric converter elements such as CCDs which are arranged in a line extending in a main scanning direction, a belt-type movement mechanism 12 which moves the image line sensor 11 in a sub-scanning direction (direction of arrow Y), a pulse motor 13 which moves the belt of the movement mechanism 12, an original table 14 on which an original is placed, an original press plate 15 which is fixedly mounted on the original table 14 to be opened and closed, a press plate sensor 16 which detects opening and closure of the press plate 15, and an original sensor 17 which detects whether there is an original on the original table 14.

The stencil making portion 20 comprises a stencil material roll portion 21 in which a roll of the stencil material is supported for rotation, a stencil making unit 22 having a thermal head where plurality of heater elements selectively generating heat on the basis of image information read by the image read-out portion 10 are arranged in a row, a platen roller 23 which conveys the stencil material unrolled from the stencil material roll portion 21, a roller motor 24 which rotates the platen roller 23, a stencil cutter 25 which cuts the stencil material conveyed by the platen roller 23 into a stencil of a predetermined length, and a stencil sensor 26 which detects the position of the stencil.

The printing portion 30 comprises a cylindrical ink-transmittable printing drum 31 which is formed of a porous metal plate or a mesh structure, an ink supply system 34 having a squeegee roller 32, a doctor roller 33 and an ink supply pump (not shown) which are disposed inside the printing drum 31, a press roller 35, a press roller motor 36 which rotates the press roller 35, a dzum speed sensor 37 which detects the speed of the printing drum 31 and a drum angle sensor 38 which detects the angle of the printing drum 31. The ink supply system 34 further comprises an ink sensor **34*a* which detects ink inside the printing drum 31, and an ink motor 34*b* which is used in the ink supply pump. The stencil is wound around the printing drum 31. Further, the printing drum 31 is removably installed and a plurality of kinds of the printing drums 31 are removably installed to the stencil printer to be exchangeable for each other. The plurality of kinds of the printing drums 31** include those having different printing areas, the A3 size and the A4 size, and are changed if necessary.

The paper supply portion 40 comprises a paper supply table 41 on which printing papers P are stacked, a pick-up roller 42 which takes out the printing papers P one by one from the paper supply table 41, a pair of timing rollers 43 which sends a printing paper P between the printing drum 31 and the press roller 35, an elevator motor 44 which moves up and down the paper supply table 41, a paper supply motor 45 which rotates the pick-up roller 42 and the timing rollers 43, and a printing paper sensor 46 which detects a printing paper P conveyed by the pick-up roller 42 and the timing rollers 43.

The paper discharge portion 50 comprises a separator 51 which peels off printed printing paper Q from the printing drum 31, a paper discharge belt portion 52, a paper discharge table 53 on which the printed printing papers Q are stacked, a printed paper sensor 54 which detects a printed printing papers Q conveyed by the paper discharge belt portion 52 and a paper discharge motor 55 which drives the paper discharge belt portion 52.

The stencil discharge portion 60 comprises a stencil discharge box 61 in which the stencil is placed after use, a discharge stencil conveyor belt portion (not shown) which conveys a stencil peeled off the printing drum 31 to the stencil discharge box 61, a discharge stencil sensor 62 which detects a discharge stencil conveyed by the discharge stencil conveyor belt portion, and a discharge stencil motor 63 which drives the discharge stencil. conveyor belt portion.

The display portion 70 may comprise a liquid crystal panel and comprises, as shown in FIG. 1, a control panel portion 71 which displays various setting items and/or contents of various operation instructions on printing such as the number of copes and at the same time, receives input of the setting items and/or various operation instructions, start instruction receiving portion which receives a start instruction of the stencil printing by the operator, a sleep display LED 73 which displays that the stencil printer is in a state of sleep (sleeping state) to be described later, and a wake-up switch 74 which returns the stencil printer to a state of wait (waiting state) from the state of sleep. The "start instruction of the stencil printing" means both a start instruction of stencil making and a start instruction of printing. Further, the control pane-portion 71 is a touch panel, and that the operator touches the control panel portion 71 and/or that the operator inputs the setting and/or the operation instruction is detected by an operation detecting portion 103 to be described later. Further, that the operator gives a start instruction to the start instruction receiving portion 72 is detected by a start instruction receiving portion 104 to be described later.

The drive motor portion 101 in FIG. 1 is a general term of drive motors for driving predetermined mechanisms used in reading the original in the image read-out portion 10, making the stencil in the stencil making portion 20, printing in the printing portion 30, paper supply in the paper supply portion 40, paper discharge in the paper discharge portion 50 and stencil discharge in the stencil discharge portion 60. For example, the drive motor portion 101 in FIG. 1 includes the pulse motor 13, the roller motor 24 in the stencil making portion 20, the press roller motor 36 and the ink motor **34*b* in the printing portion 30, the elevator motor 44 and the paper supply motor 45 in the paper supply portion 40, the paper discharge motor 55 in the paper discharge portion 50 and the discharge stencil motor 63 in the stencil discharge portion 60** but need not be limited to these motors and may include other drive motors for driving the predetermined mechanisms.

The control senor portion 102 in FIG. 1 is a general term of sensors for controlling the predetermined mechanisms. For example, the control senor portion 102 in FIG. 1 includes the roller motor 24 in the stencil making portion 20, the drum speed sensor 37, the drum angle sensor 38 and the ink sensor **34*a* in the printing portion 30, the printing paper sensor 46 in the paper supply portion 40, the printed paper sensor 54 in the paper discharge portion 50 and the discharge stencil sensor 62 in the stencil discharge portion 60** but need not be limited to these sensors and may include other sensors for controlling the predetermined mechanisms.

The operation detecting portion 103 in FIG. 1 is a means for detecting a predetermined operation by the operator. The "predetermined operation" means the operation or, the stencil printer of this embodiment necessary for the stencil printing, and includes, for instance, opening and closing of the original press plate 15 in the image read-out portion 10, setting of an original to the original table 14, opening and closing of a door in the stencil printing portion 1, touch to the control panel portion 71 (the setting input and/or the operation instruction on the control panel 71 is included), instruction to move dawn the elevator in the paper supply portion 40, instruction to release the sleep, ng state to be described later and insertion of a storage means such as a memory card storing image data. Not only such direct operations on the stencil printer but also indirect operations on the stencil printer which are carried out in external devices connected to the stencil printer such as a computer, cellular phone or digital camera may be detected. For example, input of image data from the external devices may be detected.

The operation detecting portion 103 is a means '_or detecting one of such predetermined operations, and includes, for instance, an original press plate sensor which detects opening and clos'.ng of the original press plate 15, an original sensor which detects that an original has been set to the original table 14, a door switch which detects opening and closing of a door in the stencil printing portion 1, a touch sensor which detects touch to a control panel portion 71, an elevator descent switch which detects downward movement of the elevator in the paper supply portion 40, a wake-up switch which detects instruction to release the sleeping state, a detecting system which detects insertion of a storage means such as a memory card storing image data and a detecting system which detects input of a signal from an external device connected to the image forming system such as a computer, cellular phone or digital camera. In FIG. 2, only the press plate sensor 16 and the original sensor 17 are shown and other sensors are abbreviated. The operation detecting portion 103 need not be provided with all the above-mentioned sensors and may be provided with only a part of the same. The operation detecting portion 103 may include other sensors so long as they detect an operation on the stencil printer of this embodiment essentially necessary for the stencil printing.

The start instruction detecting portion 104 in FIG. 1 detects that a start instruction to start stencil printing is made by the operator in the start instruction receiving portion 72 of the display portion 70. The start instruction detecting portion 104 detects both a start instruction of stencil making and a start instruction of printing.

The arrangement of the power source portion 2 of the stencil printer will be described with reference to FIG. 3, hereinbelow.

Figure 3:
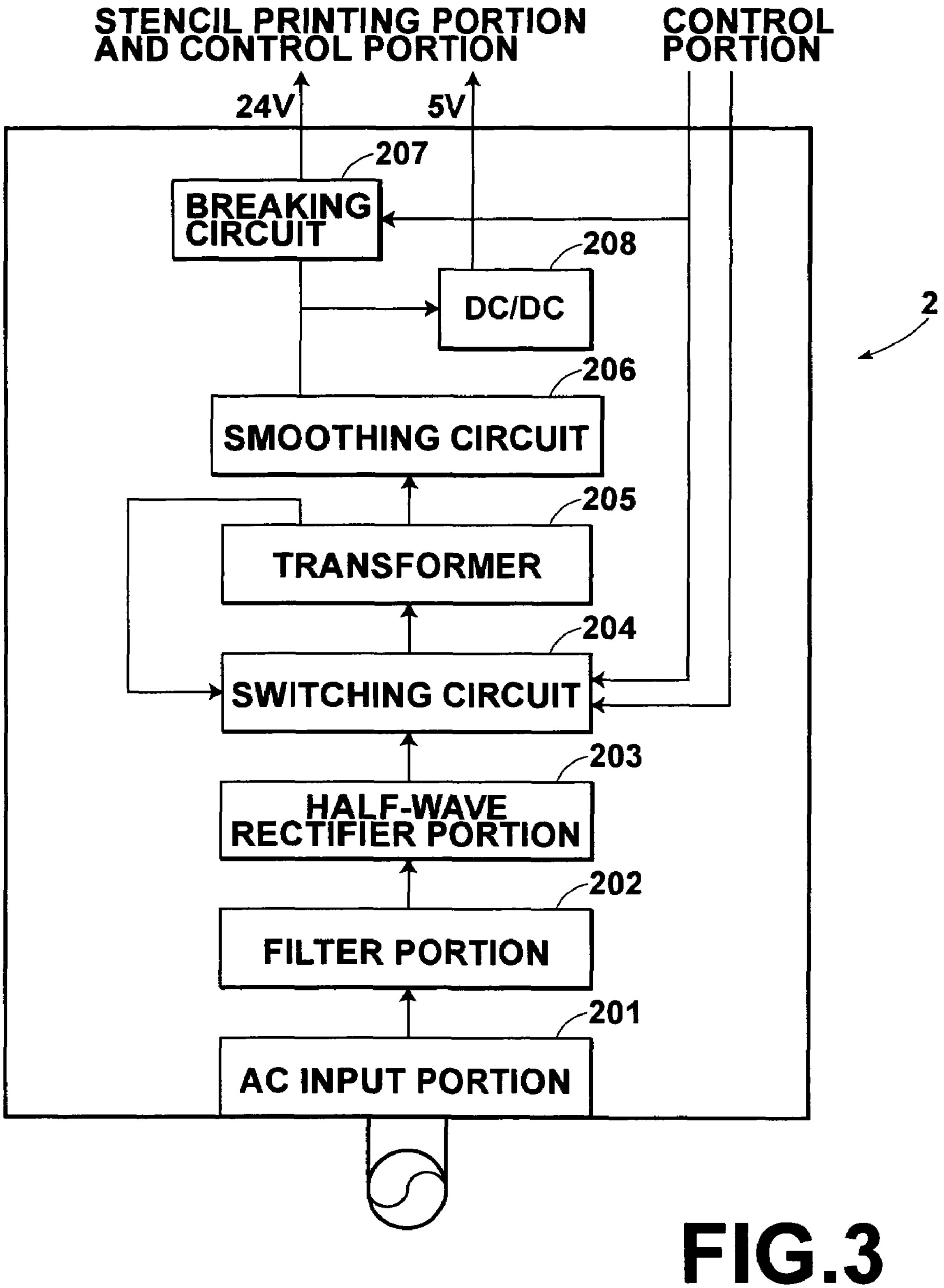
FIG. 3 is a block diagram showing the power source portion of the stencil printer shown in FIG. 1.

As shown in FIG. 3, the power source portion 2 comprises an AC input portion 201 through which an AC voltage is input from an AT source such as a domestic power source, a filter portion 202 which smoothes the AC voltage output from the AC input portion 201, a half-wave rectifier portion 203 which half-wave-rectifies the voltage smoothed by the filter portion 202, a switching circuit 204 and a transformer 205 which transform the half-wave-rectified voltage to a desired voltage and output it, a smoothing circuit 2C6 which further smoothes the voltage output from the transformer 205, a breaking circuit 207 which cuts supply to the stencil printing portion 1 of the DC voltage output from the smoothing circuit 206 on the basis of a signal from a power source control portion 301 of the control portion 3, and a DC/DC circuit 208 which transforms the value of the DC voltage output from the smoothing circuit 206 and outputs it. The switching circuit 204 changes its operating frequency according to a control signal from the internal voltage control portion to be described later, and the current slowing into the transformer 205 is switched in response to change of the operating frequency of the switching circuit 204, whereby the internal voltage output from the smoothing circuit 206 is switched between 24v, 12V and SV. Further, the DC/DC circuit 208 transforms the value of the DC voltage output from the smoothing circuit 206 to 5V.

Further, the power source portion 2 is switched among three states on the basis of a control signal from an internal voltage control portion 302, In this embodiment, the power source portion 2 is switched among a first state (will be referred to as "power source state 1", hereinbelow) where the internal voltage is 24V and 24V and 5V are supplied to the stencil printing portion 1, a second state (will be referred to as "power source state 2", hereinbelow) where the internal voltage is 12V and 5V is only supplied to the stencil printing portion 1, and a third state (will be referred to as "power source state 3", hereinbelow) where the internal voltage is 8V and 5V is only supplied to the stencil printing portion 1 as shown in the following table. In this embodiment, when the power source portion 2 is in the power source state 2, the stencil printer is in the waiting state, and when the power source portion 2 is in the power source state 3, the stencil printer is in the sleeping state.

| Power source state | Internal voltage | Supply voltage |
|---|---|---|
| Power source state 1 | 24 V | 24 V, 5 V |
| Power source state 2 (waiting) | 12 V | 5 V |
| Power source state 3 (sleeping) | 8 V | 5 V |

The control portion 3 of the stencil printer will be described, hereinbelow.

The control portion 3 controls action of the stencil printing portion 1, and as shown in FIG. 1, comprises the power source control portion 301 which cuts power supply to the drive motor portion 101 and the control sensor portion 102 from the power source portion 2 until the start instruction detecting portion 104 detects a start instruction to start stencil printing, the internal voltage control portion 302 which controls the internal voltage generated in the power source portion 2, and an image processing portion 303 which carries out predetermined image processing on the image information obtained by the image read-out portion 10 of the stencil printing portion 1. Power supply control by the power source control portion 301 and internal voltage control by the internal) voltage control portion 302 will be described later.

Operation of the system will be described with reference to the flow charts shown in FIGS. 4 to 7, hereinbelow.

When the power switch (not shown) is thrown by the operator in the stencil printer, power throwing processing for initializing the stencil printer is carried out. The power throwing processing will be described first.

Figure 4:
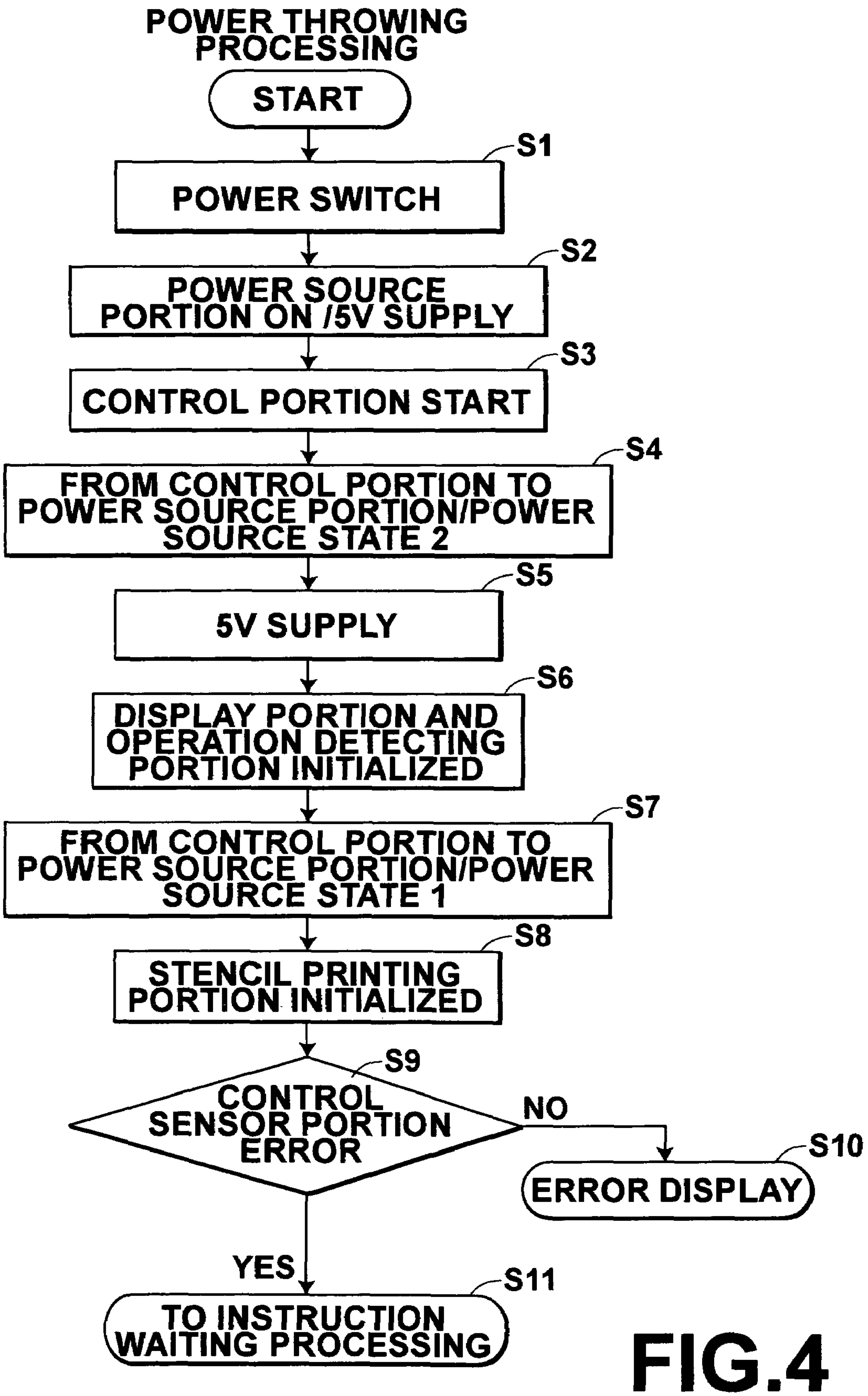
FIG. 4 is a view showing a flow chart for illustrating the power source throwing processing.

In FIG. 4, when the power switch of the stencil printer is thrown (step S1), an AC voltage is input into the power source portion 2 and the power source portion 2 generates an internal voltage of SV. Then the DC/DC circuit 208 transforms the internal voltage of BV to 5V and supplies 5V to the control portion 3. (step S2) In response to supply of 5V from the power source portion 2, the control portion 3 starts (step S3), and the power source control portion 301 of the control portion 3 outputs a control signal to make an instruction to turn the power source state to the power source state 2 to the power source portion 2 (step S4). According to the control signal, the power source portion 2 generates an internal voltage of 12V. Then the DC/DC circuit 208 transforms the internal voltage of 12V to 5V and outputs 5V. The power source portion 2 supplies 5V to the display portion 70, the operation detecting portion 1C3 and the start instruction detecting portion 1C4. (step S5) And the display portion 70, the operation detecting portion 103 and the start instruction detecting portion 104 are initialized. (step S6) Then the power source control portion 301 of the control portion 3 outputs a control signal to make an instruction to turn the power source state to the power source state 1 to the power source portion 2. (step S7) According to the control signal, the power source portion 2 generates an internal voltage of 24V. Then the DC/DC circuit :08 transforms the internal voltage of 24V to 5V and supplies 24V and 5V to the whole stencil printing portion 1, whereby the whole stencil printing portion 1 is raised and initialized. (step SB) After the above-mentioned initialization, whether the control sensor portion 102 detects an error is determined (step S9), and when it is determined in step S9 that the control sensor portion 102 detects an error, the display portion 70 displays an error message (step S10).

Whereas, when it is determined in step S9 that the control sensor portion 102 does not detect an error, the flow is shifted to instruction waiting processing (step S1).

Figure 5:
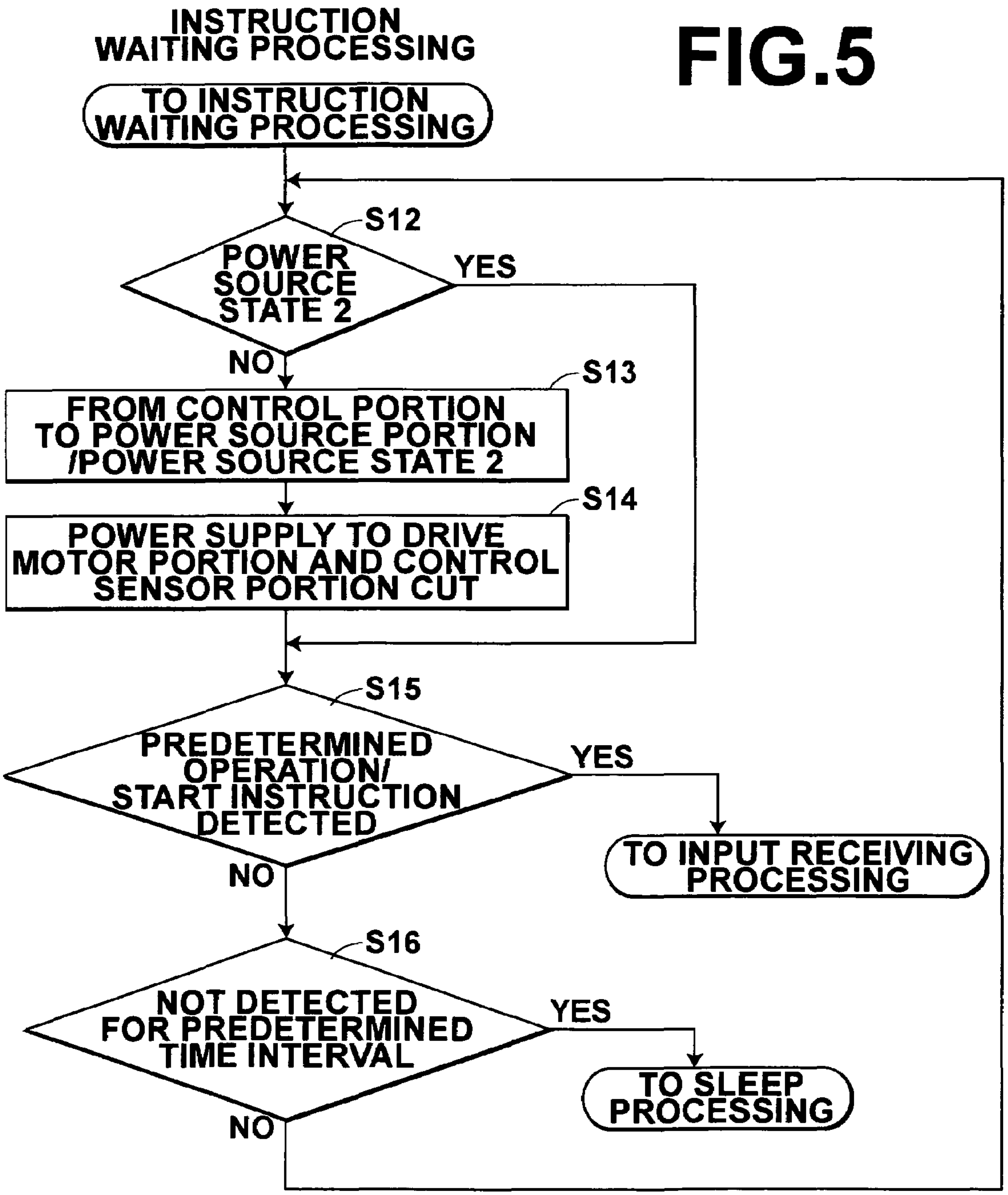
FIG. 5 is a view showing a flow chart for illustrating the instruction waiting processing.

FIG. 5 shows a flow chart for illustrating the instruction waiting processing. As shown in FIG. 5, in the instruction waiting processing, the power source control portion 301 checks whether the power source portion 2 is in the power source state 2. (step S12) Since the power source portion 2 is in the power source state 1 immediately after throwing the power switch as described above aid it is determined in step 512 that the power source portion 2 is not in the power source state 2, the power source control portion 301 of the control portion 3 outputs a control signal to make an instruction to turn the power source state to the power source sta':e2. (step S13) When the power source state is turned to the power source state 2, electric power is kept supplied to the display portion 70, the operation detecting portion 103 and the start instruction detecting portion 104 but electric power supply to other mechanises including the drive motor portion 101 and the control sensor portion 102 is cut. (step S14) This waiting state is held until predetermined operation is detected by the operation detecting portion 103 or the start of stencil printing is detected by the start instruction detecting portion 104.

When predetermined operation is detected by the operation detecting portion 103 or the stencil printing start instruction :Ls detected by the start instruction detecting portion 104, the flow is shifted to input receiving processing (step $15) whereas when neither predetermined operation nor the stencil printing start instruction is detected by the operation detecting portion 103 or the start instruction detecting portion 104 for a predetermined tine interval, the flow is shifted to sleep processing (step 516).

FIG. 6 shows a flow chart for illustrating the input receiving processing.

As shown in FIG. 6, in the input receiving processing, whether the detection in step 15 is detection of predetermined operation by the operation detecting portion 103 or detection of the stencil printing start instruction by the start instruction detecting portion 104 is first determined. (step 517) When the detection in step 15 is detection of the stencil printing start instruction by the start instruction detecting portion 104, a signal representing the fact is output to the control portion 3 and the power source control portion 301 of the contro:'portion 3 outputs a control signal to turn the power source state to the power source state 1. (step S1S) The stencil printing start instruction may be either an instruction to start the stencil making or an instruction to start the printing. In response to the control signal, the power source 2 is turned to the power source state 1, and 24V or 5V is supplied to other mechanisms including the drive motor portion 1C1 and the control sensor portion 102. Then the flow is shifted to the stencil printing processing.

Whereas when it is determined in step S17 that the detection in step S15 is not detection of the stencil printing start instruction by the start instruction detecting portion 104 but detection of predetermined operation by the operation detecting portion 103, the flow is again shifted to instruction waiting processing and the waiting state is continued.

FIG. 7 shows a flow chart for illustrating the sleep processing.

As shown in FIG. 7, in the sleep processing, a control signal to turn the power source state to the power source state 3:Ls transmitted to the power source portion 2 from the power source control portion 301 of the Control portion 3. (step S19)

According to the control signal, the power source portion 2 is turned to the power source state 3 and power supply to the control panel portion 71 of the display portion 70 is cut. (step 320) That is, when the power source portion 2 is in the power source state 3, power supply to all the parts other than the start instruction receiving portion 72, sleep display LEDs 73, a wake-up switch 74, and the operation detecting portion 103, the start instruction detecting portion 104 and the control portion 3 is cut, In this state, the sleep display LEDs 73 are lit- In the control portion 3, whether predetermined operation is detected by the operation detecting portion 103 or the start of stencil printing is detected by the start instruction detecting portion 104 is watched (step 521) and when predetermined operation is detected by the operation detecting portion 103 or the stencil printing start instruction is detected by the start instruction detecting portion 104, the power source control portion 301 of the control portion 3 outputs a control signal to turn the power source state to the power source state 2. (step 522) According to the control signal, the power source portion 2 is turned to the power source state 2 and the power is supplied to the control panel portion 71 of the display portion 70 (step S23). Then the flow is shifted to input receiving processing. Though, in the stencil printer of this embodiment, power supply to the control panel portion 71 is cut when the power source state is in the power source state 3, i.e., when the stencil printer is in the sleep state, power supply to the start instruction receiving portion 72 and '.to the start instruction detecting portion 104 may also be cut when the stencil printer is in the sleep state by watching only whether predetermined operation is detected by the operation detecting portion 103 in step $21 and controlling tae power source portion 2 to turn the power source state to the power source state 2 when predetermined operation is detected by the operation detecting portion 103. Further, it is preferred to cut power supply to a1.1. the parts other than the original press plate sensor, the original sensor and the wake-up switch 74 of the operation detecting portion 103, watch only whether the original press plate sensor, the original sensor or the wake-up switch 74 of the operation detecting portion 103 is operated in step S21 and control the power source portion 2 to turn the power source state to the power source state 2 when opening and closing of the original press plate sensor, setting of an original to the original table 14, or depression of the wake-up switch 74 is detected.

The printing processing is executed in the following manner.

The image line sensor 11 is moved in the sub-scanning direction (direction of arrow Y) by the movement mechanism 12, and the original on the original table 14 of the image read-out portion 10 is read by the image line sensor 11.

The image Information read in the image read-out portion 10 is input into the image processing portion 303 and the image processing portion 303 carries out predetermined image processing on the image information input. Then the control portion 3 outputs to the stencil printing portion 1 a control signal to make a stencil on the basis of the processed image information.

In the stencil making portion 20, the stencil material is unrolled from the stencil material roll 21 and conveyed to the stencil making unit 22. In the stencil making unit 22, the heaters of tie thermal head is selectively energized to generate heat on the basis of a control signal from the control portion 3 and image-wise perforates the stencil material to make a stencil. The stencil thus made Is conveyed toward the printing drum 31 by the platen roller 23 and wound around the printing drum 31 after cut by the stencil cutter 25.

Then ink in a predetermined color is supplied inside the printing drum 31 by the ink supply system 34. When the printing drum 31 is rotated in the counterclockwise direction as seen in FIG. 2, a printing paper P is taken out from the paper supply portion 40 at a predetermined timing in synchronization with rotation of the printing drum 31 by the pick-up roller 42, and moved left to right as seen in FIG. 2 and supplied between the printing drum 31 and the press roller 35 by the timing rollers 43. By pressing the printing paper P against the stencil wound around the printing drum 31 by the press roller 35, print is made on the printing paper P.

The printed printing paper Q is peeled off the printing drum 31 by the separator 51, conveyed to the paper discharge table 53 by the paper discharge belt portion 52, and stacked on the paper discharge table 53.

In the stencil printer described above, since the power supply to the drive motor portion 101 and the control sensor portion 102 from the power source portion 2 is cut until a start instruction is detected by the start instruction detecting portion 104, wasteful power supply to the drive motor portion 101 and the control sensor portion 102 which is not being used can be cut, and the power consumption before starting the stencil printing processing can be reduced.

Further, a predetermined operation by the operator before the start instruction detecting portion 104 detects a start instruction when the image formation processing is not being performed, and the power source control portion 301 continues to inhibit the power source portion 2 from supplying the electric power to the drive motor portion 101 and the control sensor portion 102 while the stencil printer is in a waiting state from the time when the predetermined operation is detected to the time when the start instruction is first detected after detection of the predetermined operation, the power consumption can be reduced, for instance, while the operator sets or inputs predetermined items.

Further, though in the stencil printer of the embodiment described above, power supply to both the drive motor portion 101 and the control sensor portion 102 is cut while the stencil printer is in the waiting state, power supply to one of the drive motor portion 101 and the control sensor portion 102 may be cut. When the electric power supply to the drive motor portion 101 is out, the electric power supply to all the drive motor portion 101 need not be cut but only the electric power supply to a part of the drive motor portion 101 nay be cut. Similarly, when the electric power supply to the control sensor portion 102 is cut, the electric power supply to a:0.1 the control sensor portion 102 need not be cut but only the electric power supply to a part of the control sensor portion 102 may be cut.

Further, since the electric power is supplied to the display portion 70 while the stencil printer is in the waiting state, operation instruction by the operator can be adequately received and at the same time, the power consumption can be reduced.

Further, since the electric power is not supplied to the control panel portion 71 while the stencil printer is in the sleeping state, the power consumption can be further reduced.

Further, since the internal voltage of the power source portion 2 when the stencil printer is in the waiting state is made lower than that when the power source 2 is in the power source state 1, the transformation efficiency is improved and the power consumption can be more reduced.

Further, since the internal voltage of the power source portion 2 when the stencil printer is in the sleeping state is made lower than that when the stencil printer is in the waiting state, the power consumption can be more reduced in the same manner as described above.

Further, since setting of the original to the image read-out portion 10 or opening and closing of the original press plate 15 in the image read-out portion 10 is detected and the power source portion 2 continues to be inhibited from supplying the electric power to the drive motor portion 101 and the control sensor portion 102 and the display portion 70 is caused to display while the stencil. printer is in the waiting state from the time when the operation is detected to the time when the start instruction ’o start the stencil, printing is first detected after detection of the operation, the power consumption can be reduced and at the same time, excellent operating feeling can be obtained and a quick response can be taken.

Further, it is possible to provide the control portion 3 in the stencil printer with a clock control portion 304 as shown in FIG. 1 and to control the work clock of the image processing portion 303 to be slower when the stencil printer is in the waiting state than that while the stencil printer is printing. Further, the control clock of the control portion 3 may be controlled to be slower when the stencil printer is in the sleeping state than that while the stencil printer is printing.

Though comprising a single power source, where the internal voltage and the supply voltage ran be switched, in the above-mentioned stencil printer, the power source portion 2 may comprise a plurality of power sources different from each other zn supply voltage. For example, the power source portion 2 may comprise a relatively large main power source which is 24V in supply voltage and a relatively small sub-power source which is 5V in supply voltage so that the main power source is used only when the power source 2 is in the power source state 1, and only the sub-power source is used when the power source 2 is in the power source state 2 or 3 under the control of the power source control portion 301. With this arrangement, when the power source 2 is switched to the power source state 2 or 3 and the stencil printer is to be operated in a power-saving mode, energy loss due to poor transformation efficiency upon the voltage transformation to lower the internal voltage to the supply voltage can be avoided, whereby further power-saving can be realized.

The image forming system of the present invention may be applied to printers other than the stencil printer or the copy systems.

What is claimed is:

1. An image forming system, comprising:

an image forming portion which carries out image formation processing where an image is formed on a recording medium on the basis of image information and is provided with a drive motor portion for driving predetermined mechanisms employed in the image formation processing and a control sensor portion for controlling the predetermined mechanisms, and a power source portion for supplying electric power to the image forming portion, wherein the improvement comprises:

a start instruction detecting portion which detects a start instruction to start the image formation processing;

a power source control portion which inhibits the power source portion from supplying the electric power to the drive motor portion and/or the control sensor portion before the start instruction detecting portion detects the start instruction when the image formation processing is not being performed;

an operation detecting portion which detects a predetermined operation by an operator before the start instruction detecting portion detects the start instruction when the image formation processing is not being performed; and wherein the power source control portion continues to inhibit the power source portion from supplying the electric power to the drive motor portion and/or the control sensor portion while the image forming system is in a waiting state from the time when the operation detecting portion detects a predetermined operation to the time when the start instruction detecting portion first detects the start instruction after detection of the predetermined operation.

2. An image forming system as defined in claim 1, further comprising:

an image processing portion which carries out image processing on the image information; and a work clock control portion which controls a work clock of the image processing portion to be slower before the start instruction detecting portion detects the start instruction when the image formation processing is not being performed than while the image formation processing is being performed.

3. An image forming system as defined in claim 1, further comprising:

a control clock control portion which controls a control clock of a control portion which controls predetermined mechanisms to be slower before the start instruction detecting portion detects the start instruction when the image formation processing is not being performed than while the image formation processing is being performed.

4. An image forming system as defined in claim 1, further comprising:

a display portion which displays predetermined operations of the image forming portion and at the same time, receives operation instruction by the operator, wherein the power source control portion supplies the electric power from the power source portion to the display portion while the image forming system is in the waiting state.

5. An image forming system as defined in claim 4, wherein the display portion has a control panel which displays predetermined operations of the image forming portion; and the power source control portion inhibits the power source portion from supplying the electric power to the control panel portion, when the operation detecting portion does not detect the predetermined operation for predetermined time interval, from the time at which the predetermined time interval lapses to the time at which the image forming system comes to be in the waiting state.

6. An image forming system as defined in claim 1, wherein the internal voltage control portion controls, when the operation detecting portion does not detect the predetermined operation for predetermined time interval, the internal voltage of the power source portion to be lower from the time at which the predetermined time interval lapses to the time at which the image forming system comes to be in the waiting state than while the image forming system is in the waiting state.

7. An image forming system as defined in claim 1, further comprising:

an image read-out portion which reads an original and outputs image information, wherein the predetermined operation is setting of the original to the image read-out portion.

8. An image forming system as defined in claim 1, further comprising:

an image read-out portion which reads an original and outputs image information, wherein the predetermined operation is operation of an original press plate in the image read-out portion.

9. An image forming system as defined in claim 1, further comprising:

an image processing portion which carries out image processing on the image information; and a work clock control portion which controls a work clock of the image processing portion to be slower when the image forming system is in the waiting state than while the image formation processing is being performed.

10. An image forming system as defined in claim 1, further comprising:

a control clock control portion which controls, when the operation detecting portion does not detect the predetermined operation for predetermined time interval, a control clock of a control portion controlling predetermined mechanisms from the time at which the predetermined time interval lapses to the time at which the image forming system comes to be in the waiting state to be slower than that of the control portion while the image processing is being executed.

11. An image forming system as defined in claim 1, wherein the drive motor portion includes at least one of a pulse motor which drives an image read-out portion which reads an original and outputs image information, a roller motor which drives a roller for conveying a stencil in a stencil printing as the image formation, a press roller motor which drives a press roller in a stencil printing as the image formation, and an ink motor which drives an ink supply system for supplying ink in a stencil printing as the image formation.

12. An image forming system as defined in claim 1, wherein the drive motor portion includes at least one of a pulse motor which drives an image read-out portion which reads an original and outputs image information, a roller motor which drives a roller for conveying a stencil in a stencil printing as the image formation, a press motor which drives a press roller in a stencil printing as the image formation, and an ink motor which drives an ink supply system for supplying ink in a stencil printing as the image formation.

13. An image forming system as defined in claim 1, wherein the control sensor portion includes at least one of a stencil sensor which is used in a stencil printing as the image formation to detect a position of a stencil to control the conveyer mechanism of the stencil, a drum speed sensor and a drum angle sensor which are used in a stencil printing as the image formation to control the rotating mechanism of a printing drum, and an ink sensor which is used un a stencil printing as the image formation to detect ink in a printing drum to control an ink supply system for supplying the ink.

14. An image forming system as defined in claim 1, wherein the control sensor portion includes at least one of a stencil sensor which is used in a stencil printing as the image formation to detect a position of a stencil to control the conveyer mechanism of the stencil, a drum speed sensor and a drum angle sensor which are used in a stencil printing as the image formation to control the rotating mechanism of a printing drum, and an ink sensor which is used in a stencil printing as the image formation to detect ink in a printing drum to control an ink supply system for supplying the ink.

15. An image forming system as defined in claim 1, wherein said power source portion comprises a main power source portion and a subpower source portion smaller in power than the main power source portion, and said power source control portion controls the power source portion to use only the sub-power source portion without using the main power source portion before the start instruction detecting portion detects the start instruction when the image formation processing is not being performed.

16. An image forming system, comprising:

an image forming portion which carries out image formation processing where an image is formed on a recording medium on the basis of image information and is provided with a drive motor portion for driving predetermined mechanisms employed in the image formation processing and a control sensor portion for controlling the predetermined mechanisms, and a power source portion for supplying electric power to the image forming portion, wherein the improvement comprises;

a start instruction detecting portion which detects a start instruction to start the image formation processing;

a power source control portion which inhibits the power source portion from supplying the electric power to the drive motor portion or the control sensor portion before the start instruction detecting portion detects the start instruction when the image formation processing is not being performed;

an internal voltage control portion which controls the internal voltage of the power source portion to be lower than a non-zero voltage before the start instruction detecting portion detects the start instruction when the image formation processing is not being performed than while the image formation processing is being performed; and a control clock control portion which controls a control clock of a control portion which controls predetermined mechanisms before the start instruction detecting portion detects the start instruction to be slower before the start instruction detecting portion detects the start instruction when the image formation processing is not being performed than while the image formation processing is being performed.

* * * * *